(12) United States Patent
Grupp

(10) Patent No.: US 8,240,179 B2
(45) Date of Patent: Aug. 14, 2012

(54) METHOD AND DEVICE FOR CORRECTING A BEVEL ERROR OF A POLYGONAL PROFILE, IN PARTICULAR A FLANK ALIGNMENT ERROR OF A TOOTHING

(75) Inventor: Philipp Grupp, Neulingen (DE)

(73) Assignee: Felss GmbH, Konigsbach-Stein (DE)

( * ) Notice: Subject to any disclaimer, the term of this patent is extended or adjusted under 35 U.S.C. 154(b) by 1574 days.

(21) Appl. No.: 11/660,997

(22) PCT Filed: Aug. 31, 2005

(86) PCT No.: PCT/EP2005/009356
§ 371 (c)(1),
(2), (4) Date: Feb. 23, 2007

(87) PCT Pub. No.: WO2006/024505
PCT Pub. Date: Mar. 9, 2006

(65) Prior Publication Data
US 2008/0209971 A1 Sep. 4, 2008

(30) Foreign Application Priority Data
Sep. 2, 2004 (DE) .......................... 10 2004 042 917

(51) Int. Cl.
*B23P 15/10* (2006.01)
(52) U.S. Cl. .................................. 72/74; 72/67; 72/125
(58) Field of Classification Search ................. 72/67, 74, 72/102, 105, 109, 112, 125, 370.1, 370.13, 72/370.16, 370.18, 370.21; 29/893.32, 893.35
See application file for complete search history.

(56) References Cited

U.S. PATENT DOCUMENTS
5,732,586 A 3/1998 Muessig et al.

FOREIGN PATENT DOCUMENTS
| DE | 2 300 091 | 7/1973 |
| DE | 30 18 915 A1 | 11/1981 |
| DE | 89 10 726.8 | 1/1991 |
| EP | 1 003 616 | 5/2000 |
| WO | WO 99/08813 | 2/1999 |

*Primary Examiner* — Edward Tolan
*Assistant Examiner* — Matthew G Katcoff
(74) *Attorney, Agent, or Firm* — Rabin & Berdo, P.C.

(57) ABSTRACT

The invention relates to a device for correcting a profile bevel error, in particular the tooth alignment error of the gear (V) of a workpiece (W), wherein said device (1) comprises a clamping device (3) for the workpiece (W), a tool (4) and at least one advancing device (7, 7') generating the relative movement between the workpiece (W) and the tool (4). The inventive device is characterized in that it comprises a guide device (10, 10') for the tool (4) and/or for the clamping device (3) which enables to carry out the rotating movement of the tool (4) and/or clamping device around the workpiece (W) axis (X) extending in an advance direction, wherein said rotating movement acts as a compensating movement.

15 Claims, 2 Drawing Sheets

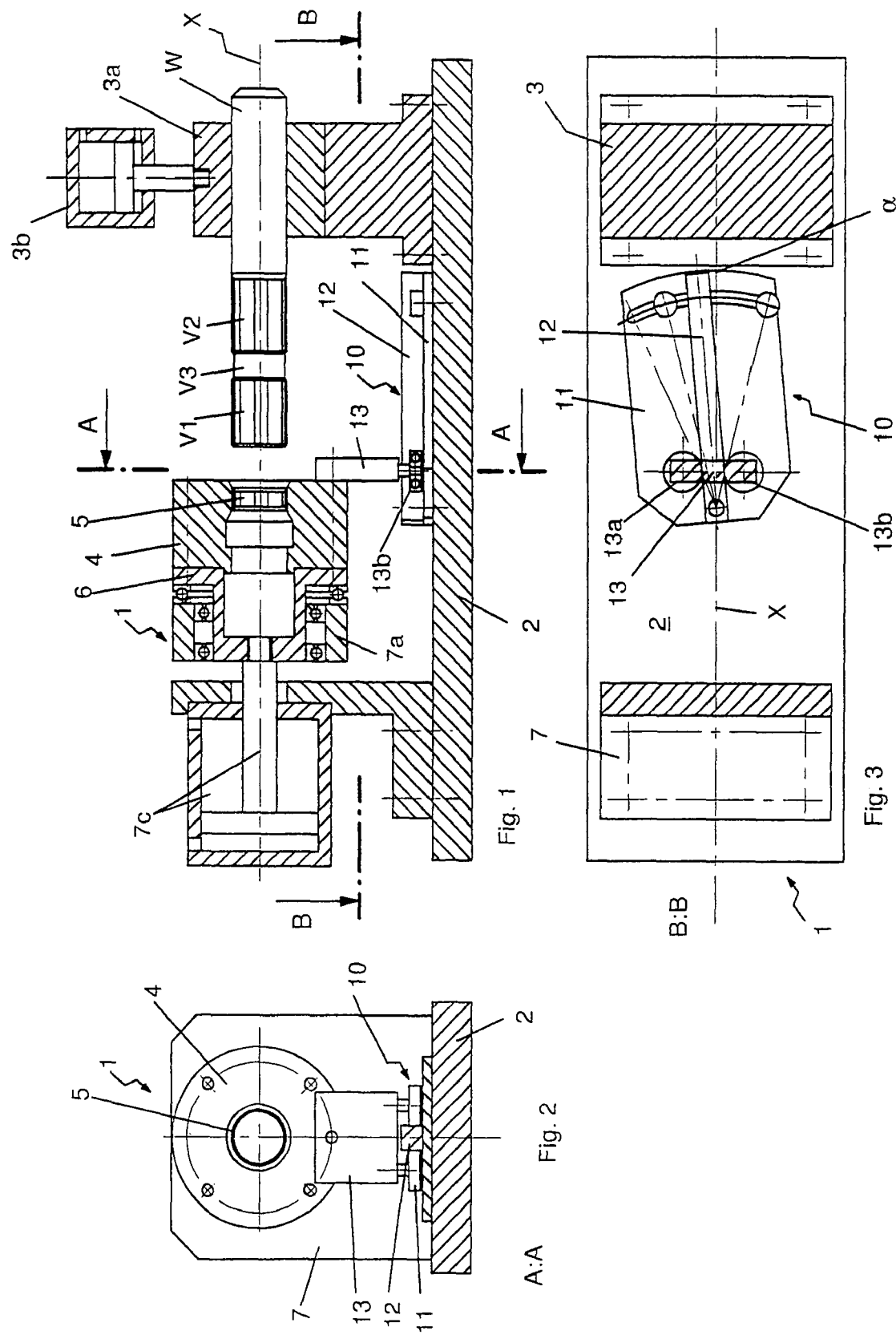

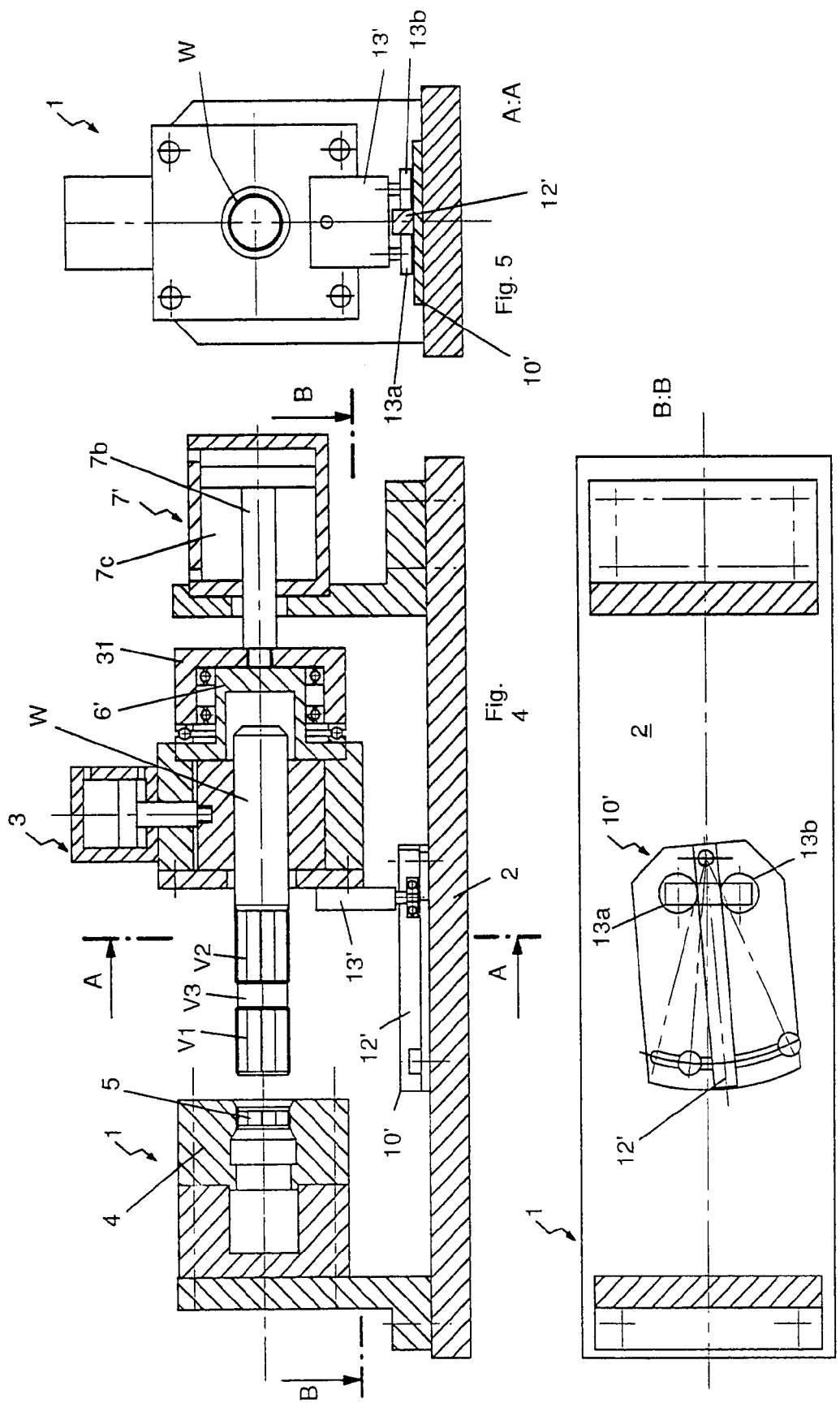

METHOD AND DEVICE FOR CORRECTING A BEVEL ERROR OF A POLYGONAL PROFILE, IN PARTICULAR A FLANK ALIGNMENT ERROR OF A TOOTHING

The invention relates to a method and a device for correcting a bevel error of a polygonal profile, in particular a flank alignment error of a toothing, wherein for forming the polygonal profile in a workpiece, in particular by cold working or by cold forging, a relative movement between the workpiece and a tool is produced by means of a feeding device, wherein the device comprises a feeding device by which a relative movement between a workpiece, to which a polygonal profile is to be applied, and a tool is effectable.

Such a method and a device suitable for carrying out the method are known. For the known methods and the known devices in a disadvantageous way in some applications, in particular when single segments of the toothing to be manufactured are separated by a waisted portion without toothing, the problem occurs that the toothings no longer run straight but exhibit a slightly helix-type structure. This can for example be caused by a play of the guidance of the workpiece and/or the forming tool, by errors of the forming tool itself, or by a relative movement between the workpiece and the forming tool occurring while the forming tool passes the waisted portion between two toothing segments.

It is an object of the present invention to develop further a method and a device of the kind mentioned in the beginning in such a way, that bevel errors of a polygonal profile, in particular flank alignment errors of a toothing, are eliminated or at least reduced.

This object is achieved by the method according to the invention by providing that a compensating movement of at least one of the tool and the clamping device in a circumferential direction of the workpiece is superposed to a relative movement between the workpiece and the tool in an axial direction of the workpiece.

For achieving the above-mentioned object, the device according to the invention provides that the device comprises a guidance means for at least one of the tool and the clamping device, by which guidance means a rotating movement of at least one of the tool and the clamping device, the rotating movement acting as a compensating movement, around an axis of the workpiece extending along a feeding direction, can be effected.

By the measures according to the invention thus in an advantageous way a method and a device are created, which excel in that in an advantageous way a correction, be it an elimination or a reduction, of bevel errors of a polygonal profile, in particular flank alignment errors of a toothing, can be performed.

Advantageous further developments of the invention are the subject-matter of the dependent claims.

Further details and advantages of the invention are to be seen from the embodiments, which are described in the following with regard to the figures. The figures show:

FIG. 1: a side view of a first embodiment of a device,
FIG. 2: a view according to line A-A of FIG. 1,
FIG. 3: a view according to line B-B of FIG. 1,
FIG. 4: a side view of a second embodiment of a device,
FIG. 5: a view according to line A-A of FIG. 4, and
FIG. 6: a view according to line B-B of FIG. 4.

In FIGS. 1-3 a first embodiment of a device for a flank alignment error-correction is illustrated, generally denoted with reference number 1. The device 1 is particularly suited for use in the method described with regard to the device 1. By means of the device 1 an external toothing V shall be applied to a workpiece W, the external toothing V having two toothing segments V1 and V2 which are separated by a non-toothed portion V3. The workpiece W is clamped in a clamping device 3 disposed on a base plate 2, wherein the clamping device 3 in the case described herein comprises clamping jaws 3a which are acted upon by a hydraulic clamping cylinder 3b. However, from the following description it is clearly apparent to the person skilled in the art, that such a design of the clamping device 3 is not necessarily required. In fact it is sufficient that by the clamping device 3 the workpiece W can be adequately fixed, such that during the subsequent forming procedure, during which the toothing V is manufactured, it is adequately held in position.

The device 1 further comprises a forming tool generally designated with reference number 4, which is designed as a female die and comprises forming elements 5 being adapted to the toothing V to be produced. In the case described herein the forming tool 4 is designed as a non-cutting forming tool. For the person skilled in the art however it is clearly apparent, that the device 1 as well as the method carried out by it cannot only be used for non-cutting forming, but also for cutting forming, for example by using a broaching tool. But for the sake of an easy description, subsequently the term "forming tool 4" is used, including cutting tools as well as non-cutting tools.

The forming tool 4 is disposed at a feeding unit 7 by means of a rotatable adapter 6. By means of the feeding unit 7 the forming tool 4 is moveable relative to the workpiece W in an axial direction thereof, such that by the forming elements 5 of the forming tool 4 the toothing V of the workpiece W can be manufactured. In the case described herein the feeding unit 7 mounted to the base plate 2 comprises a base 7a arranged on a piston 7c of a hydraulic feeding cylinder 7b, on which base 7a the adapter 6 is rotatably arranged.

In order to be able to perform a correction of flank alignment errors of the toothing V, which in particular can arise for the reasons mentioned in the beginning, it is provided that in the embodiment described herein the forming tool 4 is rotated around the axis X of the workpiece W. Therefor the device 1 comprises a guidance means 10 for the forming tool 4 being rotatably supported on the basis 7a of the feeding unit 7 by means of the adapter 6. As a consequence of the feeding of the forming tool 4 by means of the feeding unit 7, the guidance means 10 causes the forming tool 4 to perform a rotating movement around the axis X of the workpiece W and thus around the feeding direction of the feeding unit 7, the rotating movement acting as a compensating movement. Thereby it is achieved that a helix-type structure of the toothing V, usually caused by the device 1 and resulting in a flank alignment error, is compensated.

In order to be able to implement this forced coupling between the feeding movement of the forming tool 4 and its rotating movement around the axis X of the guidance means 10, for the described embodiment it is provided that—as best can be seen from FIG. 3—an angle adjustment unit 11 of the guidance means 10 is disposed on the base plate 2 of the device 1, which angle adjustment unit 11 comprises a guidance element 12, in particular an accordingly aligned straight edge, which is inclined by a certain angle α relative to the feeding direction of the feeding unit 7. The guidance element 12 guides guidance rolls 13a, 13b of another guidance element 13 of the guidance means 10 being connected to the forming tool 4 in a non-rotatable way. If now the forming tool 4 is moved in the direction of the workpiece W by the feeding unit 7, the inclined arrangement of the guidance element 12 of the guidance means 10 causes a rotation of the forming tool 4 and thus a correction of the otherwise occurring flank alignment errors.

The angle of inclination α of the guidance element 12 is determined in such a way, that in a first step of the method a toothing V is formed in a test-workpiece W, the guidance element 12 extending in a direction X (α=0). Then the flank alignment error is determined on the basis of this test-toothing and the angle of inclination α of the guidance element 12 is determined from this flank alignment error in a way known to the person skilled in the art. Then the guidance element 12 is aligned accordingly and the correction of the flank alignment error achieved by this alignment is checked by means of a new test-workpiece. Then, if necessary, the angle of inclination α is readjusted until the desired correction is achieved. For complex errors it is also possible to use a guidance element 12 with an accordingly designed guidance curve instead of a linear guidance element 12.

In this connection it is a particular advantage, if the feeding movement is not continuous but frequency-modulated, such as for example described in the European patent EP 1 003 616 of the applicant. In this case it is then preferred, that the feeding device 7 comprises a frequency-generating unit (not shown), by which the relative movement between the workpiece W and the forming tool 4 effected by the feeding unit 7 is modulatable in such a way, that after an advance stroke, during which the forming tool 4 travels a first stroke length, in a subsequent return stroke a movement of the forming tool 4 in a direction opposite to the original direction of feeding by a second stroke length is performed. In this connection it is preferred, that the first stroke length covered during the advance stroke in feeding direction is larger than the second stroke length covered during the subsequent return stroke, in which connection it is in particular advantageous, that the first stroke length is about twice as large as the second stroke length covered during the return stroke. Concerning further details of such a frequency-modulated feeding it is referred to the afore-mentioned European patent, the disclosure of which is incorporated herein by way of reference and is made to the subject matter of the present application.

In FIGS. 4-6 now a second embodiment of a device 1 is shown. Corresponding components of the two embodiments are designated with same reference numbers and are no more described in detail. The substantial difference between the first and the second embodiment is that in the second embodiment, in contrast to the first embodiment, not the forming tool 4 is advanced and rotated around its axis at least during the forming procedure, but the workpiece W is advanced and performs a respective compensating movement during the forming of the toothing V. This is achieved by arranging the clamping device 3, which fixes the workpiece W, on a base 31 by means of an adapter 6', corresponding to the adapter 6 of the first embodiment, and advancing it by means of a feeding unit 7' corresponding to the feeding unit 7.

A further guidance element 13' of a guidance means 10', according to the further guidance element 13 of the guidance device 10 of the first embodiment, then engages with the rotatable clamping device 3 and thus causes its rotation for compensating flank alignment errors.

For both of the above-mentioned embodiments it is assumed that that component of the device 1 which is advanced, that means either the forming tool 4 or the clamping device 3, performs the compensating rotation. However, it is also possible that the compensating rotation is performed by the non-advanced component, which means that for example the forming tool 4 is advanced and the clamping device 3 and thus the workpiece W performs the compensating rotation in order to avoid helix-type flank alignment errors, or vice versa. Furthermore it is possible that both components, namely the forming tool 4 and the clamping device 3, are moved relative to each other and either the clamping device 3 or the forming tool 4 performs the compensating rotation. Likewise it is possible, that both the forming tool 4 and the clamping device 3 respectively perform a partial compensating rotation, the superposition of which then results in the desired compensating rotation in respect to the workpiece W.

The two embodiments were described with regard to the particular case of the correction of flank alignment errors of a toothing V, namely an external toothing. However, the described method is not limited to the correction of the flank alignment error of an external toothing. It is also possible to correct flank alignment errors of an internal toothing of a hollow workpiece. To the person skilled in the art it is apparent from the above description, that furthermore the device 1 and the method are not limited to the correction of flank alignment errors of a toothing V. In fact with the described device 1 and the discussed method it is possible, to correct bevel errors of polygonal profiles in general.

The invention claimed is:

1. Method for correcting a bevel error of a polygonal profile, in a device for forming the polygonal profile in a workpiece, the device comprising a clamping device for the workpiece, a tool, and at least one feeding unit configured to cause a relative movement between the workpiece and the tool, characterized in that a compensating movement of at least one of the tool and the clamping device in a circumferential direction of the workpiece is superposed to the relative movement between the workpiece and the tool in an axial direction of the workpiece.

2. The method according to claim 1, wherein the tool is advanced by the feeding unit.

3. The method according to claim 1, wherein the clamping device clamping the workpiece is advanced by the feeding unit.

4. The method according to claim 1, wherein a frequency-modulated feeding movement is caused by at least one of the feeding unit of the tool and the feeding unit of the clamping device.

5. The method according to claim 4, wherein after an advance stroke, during which at least one of the tool and the clamping device travels a first stroke length, during a subsequent return stroke a movement of at least one of the tool and the clamping device by a second stroke length is performed in a direction opposite to the original feeding direction.

6. The method according to claim 5, wherein the first stroke length is larger than the second stroke length covered during the subsequent return stroke.

7. The method according to claim 1, wherein a forced coupling is implemented between the compensating movement of at least one of the tool and the clamping device and the relative movement between the tool and the workpiece.

8. The method according to claim 1, wherein a non-cutting forming tool is used as a tool.

9. The method according to claim 1, further including a device for correcting a bevel error of a profile in a workpiece, wherein the device comprises a clamping device for the workpiece, a tool and at least one feeding unit, by which a relative movement between the workpiece and the tool is caused, characterized in that the device comprises a guidance device for at least one of the tool and the clamping device, by which guidance device a rotating movement of at least one of the tool and the clamping device, the rotating movement acting as a compensating movement, is caused around an axis of the workpiece extending along a feeding direction.

10. The method according to claim 9, wherein a forced coupling between the feeding movement of at least one of the tool and the clamping device (and the compensating movement of at least one of the tool and the clamping device is caused by the guidance device.

11. The method according to claim 9, wherein the guidance device comprises an angle adjustment unit which has a guidance element which can be inclined relative to the axis of the workpiece by an angle of inclination.

12. The method according to claim 9, wherein the guidance device comprises another guidance element, which on the one hand engages the tool or the clamping device and on the other hand engages the guidance element.

13. The method according to claim 9, wherein the device comprises a frequency-generating unit cooperating with the feeding unit, by which frequency-generating unit the relative movement between the workpiece and the tool effected by the feeding device can be modulated in such a way, that after an advance stroke, during which at least one of the workpiece and the tool travels a first stroke length in the forward direction, in a subsequent return stroke a movement of at least one of the tool and the workpiece by a second stroke length can be performed in a direction opposite to the feeding device.

14. The method according to claim 9, wherein the tool is a non-cutting forming tool.

15. The method according to claim 1, wherein the method for correcting the bevel error of the polygonal profile is for a flank alignment error of the toothing.

* * * * *